US011313286B2

(12) United States Patent
Chahal et al.

(10) Patent No.: US 11,313,286 B2
(45) Date of Patent: *Apr. 26, 2022

(54) INTEGRATED PROPELLER AND ENGINE CONTROLLER

(71) Applicant: PRATT & WHITNEY CANADA CORP., Longueuil (CA)

(72) Inventors: Jasraj Chahal, Lasalle (CA); Brant Duke, Lasalle (CA); Carmine Lisio, Laval (CA); Jim R. Jarvo, Saint Bruno (CA); Giancarlo Zingaro, Pointe-Claire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 596 days.

This patent is subject to a terminal disclaimer.

(21) Appl. No.: 16/545,472

(22) Filed: Aug. 20, 2019

(65) Prior Publication Data
US 2020/0165984 A1    May 28, 2020

Related U.S. Application Data

(60) Provisional application No. 62/770,896, filed on Nov. 23, 2018, provisional application No. 62/770,912, filed on Nov. 23, 2018.

(51) Int. Cl.
*F02C 9/58* (2006.01)
*B64C 11/30* (2006.01)
(Continued)

(52) U.S. Cl.
CPC .............. *F02C 9/58* (2013.01); *B64C 11/305* (2013.01); *B64D 27/10* (2013.01); *B64D 31/00* (2013.01);
(Continued)

(58) Field of Classification Search
CPC ..... F02C 9/58; F02C 9/28; F02C 9/00; B64D 31/00; B64D 27/10; B64C 11/305;
(Continued)

(56) References Cited

U.S. PATENT DOCUMENTS 6,353,790 B1    3/2002  Tsuzuki
6,578,794 B1    6/2003  Clark et al.
(Continued)

FOREIGN PATENT DOCUMENTS

| EP | 2573629 | 3/2013 |
|----|---------|--------|
| EP | 2930334 | 10/2015 |
| EP | 3366590 | 8/2018 |

*Primary Examiner* — Bhavesh V Amin
(74) *Attorney, Agent, or Firm* — Norton Rose Fulbright Canada LLP

(57) ABSTRACT

An electronic controller for an engine and a propeller, a control system and related methods are described herein. The controller comprises a first channel and a second channel independent from and redundant to the first channel. Each channel having a control processor configured to receive first engine and propeller parameters and to output, based on the first engine and propeller parameters, at least one engine control command comprising instructions for controlling an operation of the engine and at least one propeller control command comprising instructions for controlling an operation of the propeller. Each channel also comprises a protection processor configured to receive second engine and propeller parameters and to output based on the second engine and propeller parameters, at least one engine protection command comprising instructions for protecting the engine from hazardous conditions and at least one propeller protection command comprising instructions for protecting the propeller from hazardous conditions.

20 Claims, 7 Drawing Sheets

(51) Int. Cl.
  *B64D 27/10* (2006.01)
  *B64D 31/00* (2006.01)
  *F02C 9/28* (2006.01)

(52) U.S. Cl.
  CPC .......... *F02C 9/28* (2013.01); *F05D 2220/323* (2013.01); *F05D 2220/325* (2013.01); *F05D 2270/02* (2013.01); *F05D 2270/20* (2013.01); *F05D 2270/52* (2013.01)

(58) Field of Classification Search
  CPC ......... F05D 2220/323; F05D 2220/325; F05D 2270/02; F05D 2270/20; F05D 2270/52; Y02T 50/60
  See application file for complete search history.

(56) References Cited

U.S. PATENT DOCUMENTS

| | | |
|---|---|---|
| 6,922,625 B2 | 7/2005 | Weir et al. |
| 10,040,565 B2 | 8/2018 | Looper et al. |
| 2010/0005657 A1 | 1/2010 | Van Vactor et al. |
| 2020/0165983 A1* | 5/2020 | Chahal .................. B64C 11/305 |
| 2020/0165984 A1* | 5/2020 | Chahal .................. B64C 11/305 |

* cited by examiner

INTEGRATED PROPELLER AND ENGINE CONTROLLER

CROSS-REFERENCE TO RELATED APPLICATIONS

The present application claims priority under 35 U.S.C. 119(e) of Provisional Patent Application bearing Ser. No. 62/770,896 filed on Nov. 23, 2018, and Provisional Patent Application bearing Ser. No. 62/770,912 filed on Nov. 23, 2018, the contents of which are hereby incorporated by reference.

TECHNICAL FIELD

The present disclosure relates generally to control for an engine and a propeller coupled thereto.

BACKGROUND OF THE ART

For propeller driven aircraft, the powerplant consists of a gas turbine engine and a propeller. Typically, the engine and propeller each have their own control system. For instance, the engine is controlled by an engine control system and the propeller is controlled by a separate propeller control system. However, there may be some inefficiencies with this approach.

There is therefore a need for improvements.

SUMMARY

In one aspect, there is provided an electronic controller for an engine and a propeller coupled to the engine. The controller comprises a first communication channel and a second communication channel independent from and redundant to the first communication channel. Each communication channel has a control processor and a protection processor communicating thereover. The control processor controlling the engine and the propeller in a normal mode of operation thereof and the protection processor controlling the engine and the propeller to prevent against a hazardous mode of operation thereof. The control processor is configured to receive a first set of engine and propeller parameters and to output, based on the first set of engine and propeller parameters, at least one engine control command and at least one propeller control command. The at least one engine control command comprises instructions for controlling the engine in the normal mode of operation and the at least one propeller control command comprises instructions for controlling the propeller in the normal mode of operation. The protection processor configured to receive a second set of engine and propeller parameters and to output, based on the second set of engine and propeller parameters, at least one engine protection command and at least one propeller protection command. The at least one engine protection command comprises instructions overriding the at least one engine control command to prevent hazardous operation of the engine and the at least one propeller protection command comprises instructions overriding the at least one propeller control command to prevent hazardous operation of the propeller.

In one aspect there is provided a method for controlling an engine and a propeller coupled to the engine. The method comprises receiving a first set of engine and propeller parameters at a first control processor provided in a first communication channel and at a second control processor provided in a second communication channel independent from and redundant to the first communication channel, receiving a second set of engine and propeller parameters at a first protection processor provided in the first communication channel and at a second protection processor provided in the second communication channel, generating, by at least one of the first control processor and the second control processor and based on the first engine and propeller parameters, at least one engine control command and at least one propeller control command, the at least one engine control command comprising instructions for controlling the engine in the normal mode of operation and the at least one propeller control command comprising instructions for controlling the propeller in the normal mode of operation, generating, by at least one of the first protection processor and the second protection processor and based on the second engine and propeller parameters, at least one engine protection command and at least one propeller protection command, the at least one engine protection command comprising instructions for overriding the at least one engine control command to prevent hazardous operation of the engine and the at least one propeller protection command comprising instructions for overriding the at least one propeller control command to prevent hazardous operation of the propeller, outputting, by at least one of the first control processor and the second control processor, the at least one engine control command and the at least one propeller control command, and outputting, by at least one of the first protection processor and the second protection processor, the at least one engine protection command and the at least one propeller protection command.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
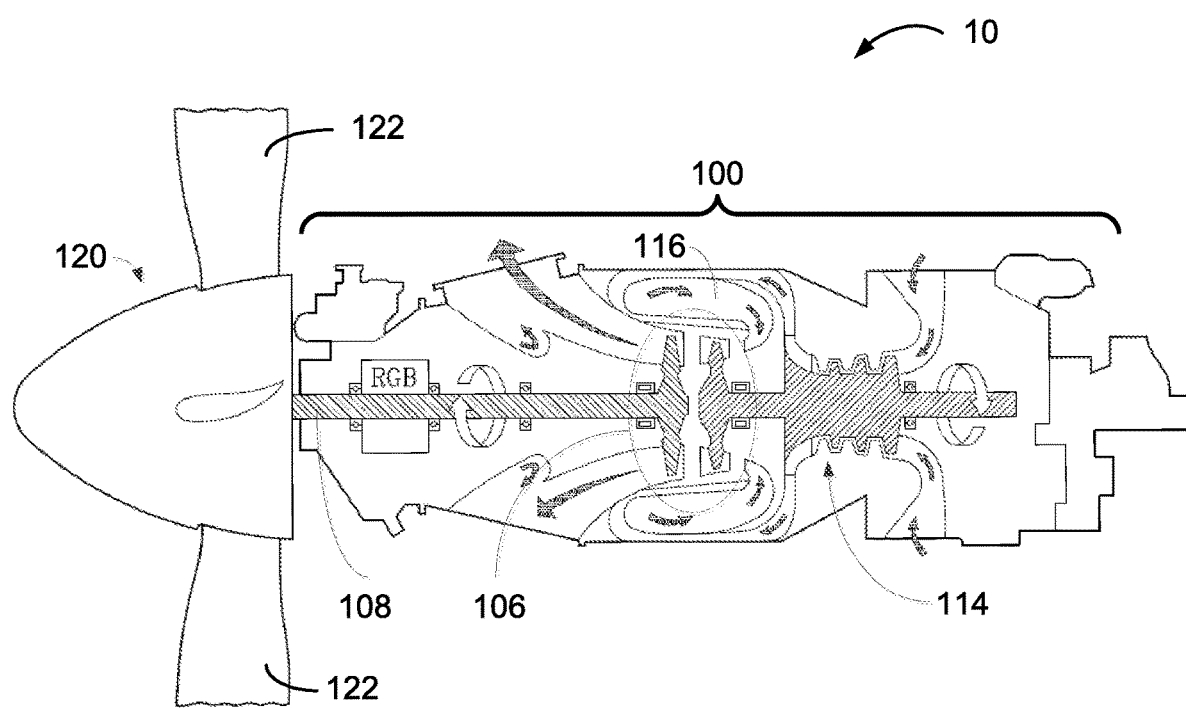
FIG. 1 is a schematic cross-sectional view of an example gas turbine engine and propeller.

FIG. 1 illustrates a turbopropeller powerplant 10 for an aircraft of a type preferably provided for use in subsonic flight, generally comprising an engine 100 and a propeller 120. The turbopropeller powerplant 10 can be controlled using the controllers and systems described herein. The turbopropeller powerplant 10 generally comprises in serial flow communication the propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases. The propeller 120 converts rotary motion from a shaft of the engine 110 to provide propulsive force for the aircraft, also known as thrust. The propeller 120 comprises one or more propeller blades 122. A blade angle of the propeller blades 122 may be adjusted. The blade angle may be referred to as a beta angle, an angle of attack or a blade pitch. The turbopropeller powerplant 10 may be implemented to comprise a single or multi-spool gas turbine engine with a free turbine or boosted architecture, where the turbine section 106 is connected to the propeller 120 typically through a reduction gearbox (RGB).

Figure 2:
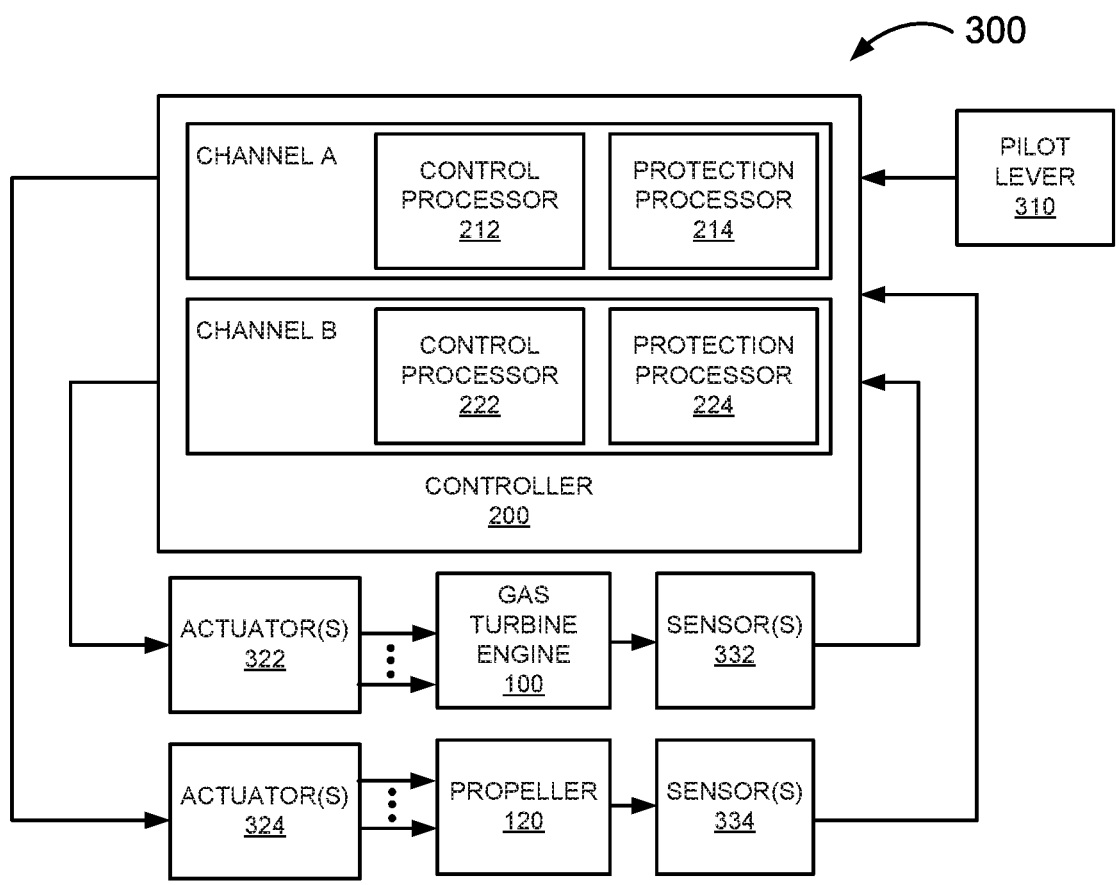
FIG. 2 is a block diagram of an integrated propeller and engine controller for controlling the engine and the propeller of FIG. 1, in accordance with an embodiment.

With reference to FIG. 2, there is shown an integrated propeller and engine controller 200 for engine control and protection and propeller control and protection. The controller 200 is illustrated as part of a control system 300 for controlling the engine 100 and the propeller 120 mechanically coupled to the engine 100. It should be understood that, while the controller 200 and the system 300 are described herein with reference to the engine 100 and the propeller 120 of FIG. 1, this is for example purposes. The controller 200 and/or the system 300 may be used with any other suitable engine and/or other suitable propeller.

The controller 200 provides both engine and propeller control and protection in a single electronic control unit. The controller 200 comprises a first communication channel (hereinafter "channel A") and a second communication channel (hereinafter "channel B"). In other words, the controller 200 is a dual channel controller having channels A and B. The two channels A and B are fully redundant as each channel A and B implements the same functionality. The two channels A and B are independent from each other, as the operation of each channel does not depend on the operation of the other channel.

Each channel (e.g., channel A) comprises two processors (e.g., processors 212, 214). One processor (e.g., processor 212) is dedicated to engine and propeller control functions and the other processor (e.g., processor 214) is dedicated to engine and propeller protection functions. The engine and propeller control functions are for controlling the operation of the engine 100 and propeller 120. The engine and propeller protection functions are for protecting the engine 100 and the propeller 120 from (i.e. providing protection against the occurrence of) hazardous condition(s). As used herein, the term "hazardous condition" refers to a condition or event that is hazardous, or harmful, to operation of the engine 100 or propeller 120. The engine and propeller protection functions therefore prevent hazardous operation of the engine 100 and of the propeller 120. The control functions are thus for controlling operation of the engine and propeller in a normal mode of operation and the protection functions are for protecting the engine and propeller from a hazardous mode of operation that would occur if the control functions of the normal mode of operation are not overridden.

As illustrated, channel A comprises a first control processor 212 and a first protection processor 214 and channel B comprises a second control processor 222 and second protection processor 224. The control processors 212, 222 are independent from each other and one of the processors is redundant as both control processors 212, 222 implement the same functionality. Similarly, the protection processors 214, 224 are independent from each other and one of the processors is redundant as both protection processors 214, 224 implement the same functionality. The control processors 212, 222 are configured to provide engine and propeller control functions and the protection processors 214, 224 are configured to provide engine and propeller protection functions. Functions that are deemed not to be control or protection functions (e.g., parameter exceedance monitoring) may be allocated to either the control processors 212, 222 or the protection processors 214, 224.

In particular, each control processor 212, 222 is configured to receive engine and propeller parameters and to output, based on the engine and propeller parameters, at least one engine control signal (also referred to herein as an "engine control command") comprising instructions for controlling the engine 100 in the normal mode of operation and at least one propeller control signal (also referred to herein as an "propeller control command") comprising instructions for controlling the propeller 120 in the normal mode of operation. Similarly, each protection processor 214, 224 is configured to receive engine and propeller parameters and to output based on the engine and propeller parameters, at least one engine protection signal (also referred to herein as an "engine protection command") comprising instructions for protecting the engine 100 by overriding the at least one engine control command to prevent hazardous operation of the engine 100 and at least one propeller protection signal (also referred to herein as an "propeller protection command") comprising instruction for protecting the propeller 120 by overriding the at least one propeller control command to prevent hazardous operation of the propeller 120. The engine and propeller parameters received at each processor 212, 214, 222, 224 may vary depending on practical implementations. The engine and propeller parameters received at a given processor 212, 214, 222, 224 may be referred to as a set of engine and propeller parameters. For example, the control processors 212, 222 may receive a first set of engine and propeller parameters and the protection processors 214, 224 may receive a second set of engine and propeller parameters. The engine and propeller parameters received at each processor 212, 214, 222, 224 may comprise the same parameters, different parameters, independent parameters and/or redundant parameters. Various examples of the received engine and propeller parameters are described further elsewhere in this document.

The engine and propeller parameters are related to the operation and control of the engine 100 and the propeller 120. In accordance with an embodiment, the engine parameters comprise at least one engine operation parameter and at least one engine control parameter; and the propeller parameters comprise at least one propeller operation parameter and at least one propeller control parameter. The engine operation parameters are indicative of at least one operating condition of the engine 100 and include, but are not limited to, one or more of fuel flow (WF) to the engine 100, a position of at least one inlet guide vane (IGV), a position of at least one core variable guide vane (VGV), engine bleed, a position of at least one bleed off valve (BOV), rotational speed of the engine 100, shaft power, shaft torque, shaft speed, compressor pressure, turbine temperature and/or any other suitable engine operation parameter. The propeller operating parameters are indicative of at least one operating condition of the propeller 120 and include, but are not limited to, one or more of a position of the blade angle of the propeller 120, a position of a beta ring of the propeller 120, a rotational speed of the propeller 120 and/or any other suitable propeller operation parameter. The engine control parameters relate to the control of the engine 100 and include, but are not limited to, one or more of a target engine thrust, a target engine output power and/or any other suitable engine control parameter. The propeller control parameters are instructions for controlling the propeller 120 and include, but are not limited to, one or more of a target propeller rotational speed, a target blade pitch angle and/or any other suitable propeller control parameter.

The engine and propeller parameters may be monitored by one or more sensors 332, 334 communicatively coupled to the controller 200. For example, the sensor(s) 332 may be configured to measure engine operation parameters and the sensor(s) 334 may be configured to measure propeller operation parameters. In one embodiment, the sensor(s) 332 may be coupled to the engine 100 and the sensor(s) 334 may be coupled to the propeller, as illustrated in FIG. 2. In another embodiment, the sensor(s) 332 may be integrated with the engine 100 and the sensor(s) 334 may be integrated with the propeller 120. The measurements of the engine parameters and propeller parameters may be continuously received (e.g., in real time) and/or may be received in accordance with any suitable regular or irregular time interval. Additionally or alternatively, the engine and propeller parameters may be provided by one or more aircraft or/and engine computers.

In accordance with an embodiment, the engine and propeller control parameters are indicative of one or more commands from one or more pilot levers 310. The pilot lever(s) 310 may include, but is not limited to, a thrust lever to set the target engine thrust, a power lever used to set the target engine output power, a condition lever used to set the target propeller rotational speed, a condition lever used to set the target blade pitch angle, and/or any other suitable pilot lever. The engine and propeller control parameters may be provided directly from the pilot lever(s) 310 (e.g., by one or more sensors) or provided by an engine and/or aircraft computer communicatively coupled to the pilot lever(s) 310. The aircraft computer may determine one or more engine and propeller control parameters from measurements obtained from one or more sensors of the pilot lever(s) 310.

The engine and propeller parameters can be provided to the controller 200 by way of input signals from one or more sensors 332, 334, one or more pilot levers 310 and/or one or more aircraft and/or engine computers. A given engine or propeller parameter may be referred to as an operating parameter of the assembly 10. Accordingly, a given sensors 332, 334 can measure a given operating parameter of the assembly 10. Depending on practical implementations, input signals to each of the processors 212, 222, 214, 224 may comprise the same signals, different signals, independent signals and/or redundant signals. Various examples of the input signals to each of the processor 212, 222, 214, 224 is described elsewhere in this document.

Each control processor 212, 222 is configured to generate control signals for controlling the engine 100 and the propeller 120 based on the received engine and propeller parameters. The control signals comprise instructions for controlling the operation of the engine 100 (i.e., for controlling at least one operating condition of the engine 100) and the operation of the propeller 120 (i.e., for controlling at least one operating condition of the propeller 120). In accordance with an embodiment, the control signals comprise at least one engine control signal for controlling the operation of the engine 100 and at least one propeller control signal for controlling the operation of the propeller 120. The engine control signals may comprise instructions to adjust one or more of the engine operation parameters to control an operating condition of the engine 100. The propeller control signals may comprise instructions to adjust one or more propeller operation parameters to control an operating condition of the propeller 120.

Each control processor 212, 222 may be configured to generate at least one engine control signal for controlling the engine based on one or more engine parameters and/or based on one or more propeller parameters. Similarly, each control processor 212, 222 may be configured to generate at least one propeller control signal for controlling the propeller based on one or more engine parameters and/or based on one or more propeller parameters. Each control processor 212, 222 is configured to output the control signals. By way of a simplified example, the engine control signal may be a fuel flow command to adjust the fuel flow to the engine 100 and the propeller control signal may be a beta angle command to adjust the beta angle of the propeller 120.

In accordance with an embodiment, each control processor 212, 222 is configured to output the engine and propeller control signals to one or more actuators 322, 324 for controlling operation of the engine 100 and the propeller 120. The actuator(s) 322 may indeed adjust the one or more engine parameters (e.g., adjust physical components of the engine 100) according to the engine control signals while the actuator(s) 324 may adjust the one or more propeller parameters (e.g., adjust physical components of the propeller 120) according to the propeller control signals. For example, the actuator(s) 322 may actuate (e.g. turn "ON" or "OFF") a fuel pump to adjust the fuel flow to the engine 100. By way of another example, the actuator(s) 324 may adjust a position of a propeller pitch change actuator to adjust the beta angle. It should be understood that, while the actuator(s) 322 are illustrated as separate from the engine 100 (for clarity purposes), the actuator(s) 322 may be integrated with the engine 100. Similarly, while the actuator(s) 324 are illustrated as separate from the propeller 120, the actuator(s) 324 may be integrated with the propeller 120.

Each protection processor 214, 224 is configured to generate control signals (referred to herein as "protection signals") for protecting the engine 100 and the propeller 120 based on the received engine and propeller parameters. In accordance with an embodiment, the protection signals comprise at least one engine protection signal comprising instructions for protecting the engine 100 from one or more hazardous conditions and at least one propeller protection signal comprising instructions for protecting the propeller 120 from one or more hazardous conditions. The hazardous condition(s) of the propeller 120 may be the same as or may be different from the hazardous condition(s) of the engine 100. Each protection processor 214, 224 may be configured to generate the at least one engine protection signal based on one or more engine parameters and/or based on one or more propeller parameters. Similarly, each protection processor 214, 224 may be configured to generate the at least one propeller protection signal based on one or more engine parameters and/or based on one or more propeller parameters. In one embodiment the engine protection signal(s) may comprise instructions to adjust one or more of the engine operation parameters to control an operating condition of the engine 100 in order to protect the engine 100 from a hazardous condition. The propeller protection signal(s) may comprise instructions to adjust one or more propeller operation parameters to control an operating condition of the propeller 120 in order to protect the propeller 120 from a hazardous condition. Each protection processor 214, 224 is configured to output the protection signal(s), with the engine protection signal(s) being output to the actuator(s) 322 and the propeller protection signal(s) being output to the actuator(s) 324.

In some embodiments, the configuration of the controller 200 and/or the control system 300 allows for one or more of: the elimination of heavy hydro mechanical devices dedicated to protection functions (e.g., engine overspeed, propeller overspeed, below minimum in-flight propeller blade angle, etc.); the elimination of a second electronic controller separate from controller 200; and the simplification of the electrical harness and interface, while maintaining the independence of the control and protection functionalities. In accordance with an embodiment, there is a single controller 200 for both the engine 100 and the propeller 120, and the electrical signals are going to this single controller 200 rather than to separate controllers. This can allow for simplification of harness design as there may be fewer entities involved in harness design and routing. This may also allow for a weight reduction because the electrical signals are only routed to a single controller. The controller 200 and/or the control system 300 differs from conventional systems having separate engine and propeller control systems, where each of the engine and propeller control systems typically have a single processor and a hydro-mechanical backup. It should be appreciated that the hydro-mechanical backup is typically heavy and may add an undesirable complexity and weight to the control system. The controller 200 and/or the control system 300 also differs from conventional systems where segregation of the engine and propeller control systems exists and each of the engine and propeller control systems have a dual channel electronic controller with a processor on each channel. Segregation of the control systems may exist because different engine and propeller suppliers develop their own proprietary controller with proprietary software. Segregation of the control systems may also exist to provide redundancy to ensure that no single electronic failure can lead to a hazardous event. It should be appreciated that the segregation of the control systems may add an undesirable complexity to the control of the powerplant. The controller 200 and/or the control system 300 may also differ from conventional additional independent safety systems dedicated to safety functions used to protect against hazardous events such as propeller overspeed. Such additional safety systems are typically either hydro-mechanical in nature or are provided in a separate electronic controller to the ones allocated to controlling the engine and the propeller.

Figure 3:
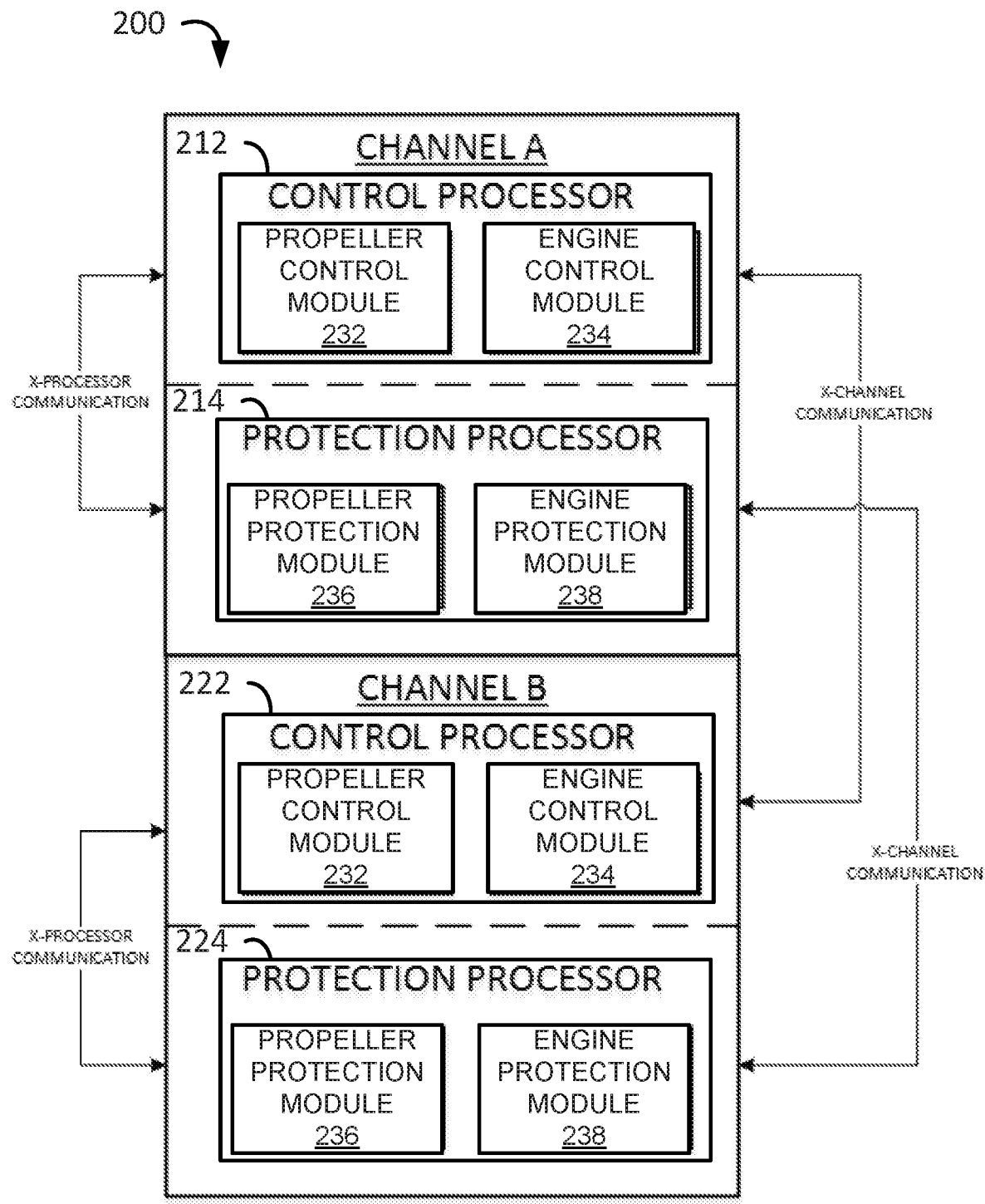
FIG. 3 is a block diagram of the controller of FIG. 2 with propeller and engine control and protection modules, in accordance with a specific and non-limiting example of implementation.

With additional reference to FIG. 3, there is shown a specific and non-limiting example of the controller 200. In this example, each control processor 212, 222 comprises a propeller control module 232 and an engine control module 234. The propeller control module 232 may use propeller control laws to control the propeller 120 and the engine control module 232 may use engine control laws to control the engine 100. The control laws may be implemented as any suitable function that determines one or more output parameters based on one or more input parameters. The engine control laws may be used to determine the control signals for controlling the engine based on the one or more engine and/or propeller parameters. Similarly, the propeller control laws are used to determine the control signals for controlling the propeller based on the one or more engine and/or propeller parameters.

Each control processors 212, 222 may be configured for one or more of: governing a rotational speed of the engine 100, governing an output power of the engine 100, limiting a torque of the engine 100, limiting the rotational speed of the engine 100, governing a beta angle of the propeller 120, governing the rotational speed of the propeller, adjusting the position of a bleed off valve, and adjusting the angle of an inlet guide vane. The aforementioned limiting or governing relating to the engine 100 may be performed by the engine control module 234 and the aforementioned limiting or governing relating to the propeller 120 may be performed by the propeller control module 232. In particular, the engine control module 234 may be configured to determine the at least one engine control signal comprising instructions for one or more of: governing the rotational speed of the engine 100, governing the output power of the engine 100, limiting the torque of the engine 100, and limiting the rotational speed of the engine 100. The propeller control module 232 may be configured to determine the at least one propeller control signal comprising instructions for one or more of: governing a beta angle of the propeller, and governing a rotational speed of the propeller.

In the illustrated example, each protection processor 214, 224 comprises a propeller protection module 236 and an engine protection module 238. The propeller protection module 236 may use propeller protection functions to protect the propeller 120 and the engine protection module 238 may use engine protection functions to protect the engine 100. The engine protection functions may be used to determine the engine protection signals for protecting the engine 100 based on one or more engine and/or propeller parameters. Similarly, the propeller protection functions may be used to determine the propeller protections signals for protecting the propeller based on one or more engine and/or propeller parameters.

Each protection processor 214, 224 is configured to protect the engine 100 and the propeller 120 against hazardous conditions. For instance, each protection processor 214, 224 may be configured for one or more of: protecting the engine 100 from overspeed, protecting the engine 100 from uncontrolled high thrust, protecting the propeller from minimum flight beta, protecting the propeller 120 from overspeed, feathering the propeller 120 when the output power of the engine 100 is not contributing to thrust, uptrimming the output power of the engine 100 during a take-off phase of flight when a second engine fails (i.e., when an aircraft comprises the engine 100 and the second engine), feathering the propeller 120 during a take-off or a go-around phase of flight when the second engine of the aircraft fails, and protecting in-flight against inadvertent operating of the propeller 120 below a flight fine pitch or reverse propeller pitch by limiting the blade angle of the propeller 120 to a minimum in-flight blade angle. The aforementioned protection relating to the engine 100 may be performed by the engine protection module 238 and the aforementioned protecting relating to the propeller 120 may be performed by the propeller protection module 236. In particular, the engine protection module 238 may be configured to determine the at least one engine protection signal comprising instructions for one or more of: protecting the engine 100 against overspeed, and uptrimming the output power of the engine 100 when a second engine of an aircraft fails. The propeller protection module 236 may be configured to determine the at least one propeller protection signal comprising instructions for one or more of: protecting the propeller 120 from overspeed, feathering the propeller 120 when the output power of the engine 100 is not contributing to thrust, and protecting in-flight against operating of the propeller 120 below a flight fine pitch or reverse propeller pitch by limiting the blade angle of the propeller 120 to a minimum in-flight blade angle.

In accordance with an embodiment, the processors (e.g., processors 212, 214) in each channel (e.g., channel A) are configured for cross-processor communication. The cross-processor communication may allow the processors to share information and synchronize their actions (e.g., processing and/or output). In accordance with an embodiment, each channel is configured for cross-channel communication. The cross-channel communication may allow for the channels to share information and synchronize their actions (e.g., processing and/or output). The cross-processor communication and/or the cross-channel communication may vary depending on practical implementations.

Figure 4:
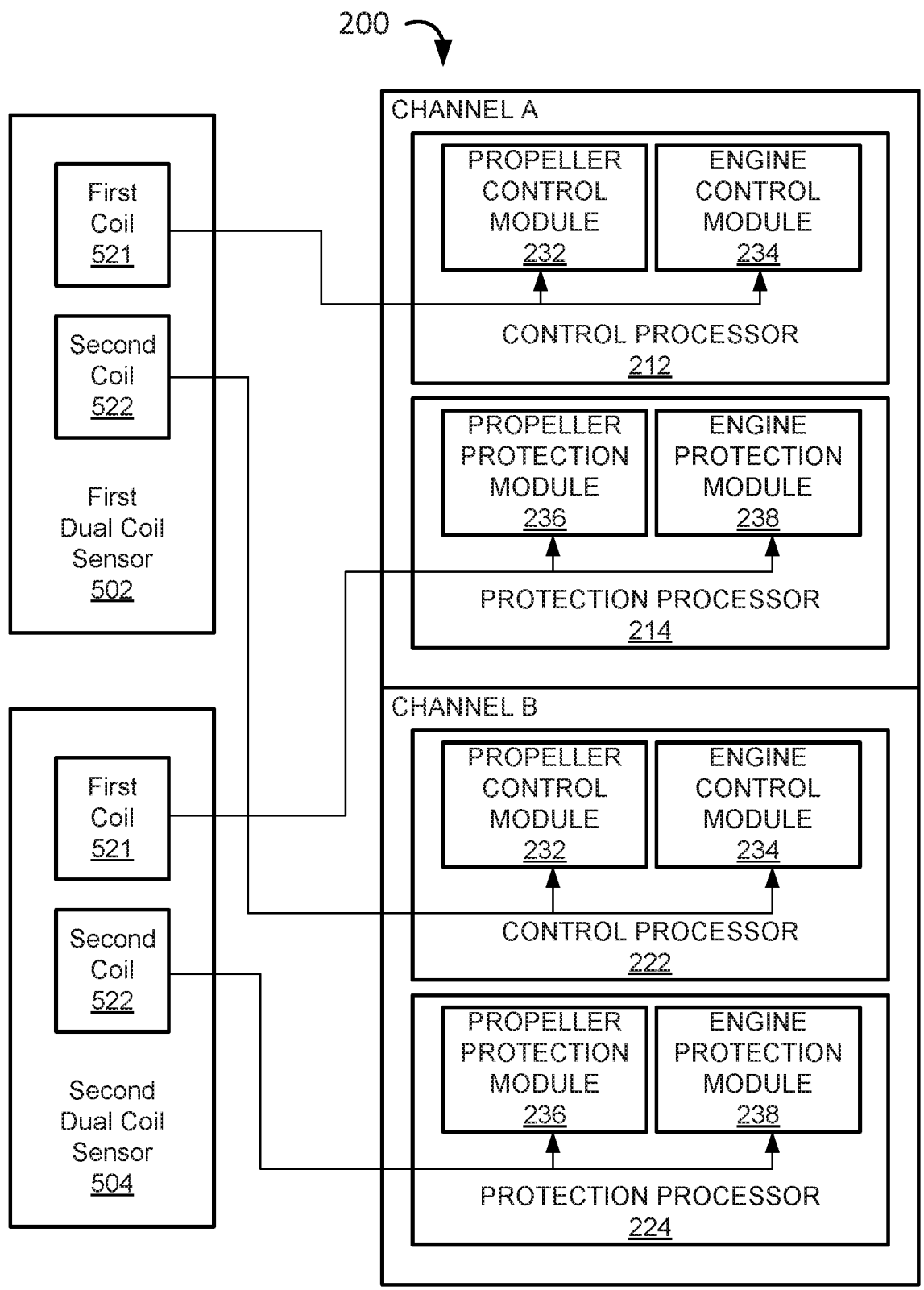
FIG. 4 is a block diagram of the controller of FIG. 3 illustrating dual coil sensors.

Referring to FIG. 4, the controller 200 is illustrated, where the controller 200 is communicatively coupled to at least one first sensor 502 and at least one second sensor 504. In this embodiment, the first sensor 502 is for measuring a first parameter of the engine 100 or the propeller 120 (i.e., an engine parameter or a propeller parameter) and the second sensor 504 is for measuring a second parameter of the engine 100 or the propeller 120. Each control processor 212, 222 is configured to receive engine and propeller parameters comprising the first parameter from the first sensor 502 and the protection processors 214, 224 are each configured to receive engine and propeller parameters comprising the second parameter from the second sensor 504.

In some embodiments, each of the first and second sensor 502, 504 are dual coil sensors comprising a first coil 521 and a second coil 522. The first and second coils 521, 522 of the first sensor 502 are configured for measuring the first parameter and the first and second coils 521, 522 of the second sensor 504 are configured for measuring the second parameter. Accordingly, the first coil 521 of the first sensor 502 provides a first measurement of the first parameter to the first control processor 212 and the second coil 522 of the first sensor 502 provides a second measurement of the first parameter to the second control processor 222. The second measurement of the first parameter is independent from and redundant to the first measurement of the first parameter. Similarly, the first coil 521 of the second sensor 504 provides a first measurement of the second parameter to the first protection processor 214 and the second coil 522 of the second sensor 504 provides a second measurement of the second parameter to the second protection processor 224. The second measurement of the second parameter is independent from and redundant to the first measurement of the second parameter. The first parameter may be the same as or different from the second parameter. In some embodiments, the first and second measurements of the first and second parameter are independent from and redundant to each other.

Alternatively, in some embodiments, a given dual coil sensor 502, 504 may be replaced with two separate sensors for obtaining independent and redundant measurements of the first parameter and/or the second parameter. For example, instead of using the two dual coil sensors 502, 504, four independent sensors may be used. Accordingly, separate sensors may be used to provide the first and second measurements of the first and second parameters.

In some embodiments, when the first parameter is an engine parameter, the first control processor 212 is configured to generate the at least one engine control signal based on the first measurement of the first parameter and the second control processor 222 is configured to generate the at least one engine control signal based on the second measurement of the first parameter. In some embodiments, when the first parameter is a propeller parameter, the first control processor 212 is configured to generate the at least one propeller control signal based on the first measurement of the first parameter and the second control processor 222 is configured to generate the at least one propeller control signal based on the second measurement of the first parameter.

In some embodiments, when the second parameter is an engine parameter, the first protection processor 214 is configured to generate the at least one engine protection signal based on the first measurement of the second parameter and the second protection processor 224 is configured to generate the at least one engine control signal based on the second measurement of the second parameter. In some embodiments, when the second parameter is a propeller parameter, the first protection processor 214 is configured to generate the at least one propeller protection signal based on the first measurement of the second parameter and the second protection processor 224 is configured to generate the at least one propeller protection signal based on the second measurement of the second parameter.

Each processor 212, 214, 222 and 224 has at least one input that is separate and electrically independent from the inputs of the other processors. A given processor (e.g., the first control processor 212) may receive at least one input signal that is independent from and redundant to the input signals received by at least one of the other processors (e.g., the first protection processor 214, the second control processor 222, and the second protection processor 224). As used herein, the term "independent" in reference to signals refers to signals coming from different sources. As used herein, the term "redundant" in reference to a signal refers to a signal that conveys similar or duplicate information as another signal. Each control processor 212, 222 may receive an input signal indicative of the first parameter and each protection processor 214, 224 may receive an input signal indicative of the second parameter.

The second control processor 222 may receive input signals that are independent from and redundant to the input signals received by the first control processor 212. Similarly, the second protection processor 224 may receive input signals that are independent from and redundant to the input signals received by the first protection processor 214. Each control processor 212, 222 may provide the input signal to the propeller control module 232 and the engine control module 234. Similarly, each protection processor 214, 224 may provide the input signal to the propeller protection module 236 and the engine protection module 238. Each processor 212, 214, 222 and 224 may determine the control signals for controlling the engine 100 and the propeller 120 and the protection signals for protecting the engine 100 and the propeller 120 based on the received input signals.

In some embodiments, the first control processor 212 receives at least one first input signal and the second control processor 222 receives at least one second input signal. The at least one second input signal is independent from and redundant to the at least one first input signal. Each signal of the first and second input signals corresponds to the first parameter. In some embodiments, the first protection processor 214 receives at least one third input signal and the second protection processor 224 receives at least one fourth input signal. The at least one third input signal is independent and redundant to the at least one fourth input signal. Each signal of the third and fourth input signals corresponds to the second parameter. In some embodiments, the first, second, third and fourth signals all comprise a common parameter. Alternatively, in some embodiments, the first parameter of the first and second signals is different from the second parameter of the third and fourth signals.

In some embodiments, each dual coil sensor 502, 504 is a power turbine speed and torque (NPT/Q) sensor. The NPT/Q sensor is configured for measuring both power turbine speed and torque generated at the output shaft 108 of the engine 100, the output shaft 108 connected to the RGB which reduces the shaft speed to a speed that is suitable for the propeller 120. A first NPT/Q sensor may be coupled (e.g., mounted) to the gearbox RGB and used to measure power turbine speed and torque of the engine 100. The first NPT/Q sensor may provide independent power turbine speed and torque measurements to the control processors 212, 222 of each channel A, B. The controller 200 may determine propeller rotational speed based on the measurement of the power turbine speed knowing the gear ratio in the gearbox RBG. In some embodiments, this allows for the elimination of a dedicated propeller rotational speed (Np) sensor mounted to the propeller assembly. The control processors 212, 222 may determine shaft horse power (SHP) based on the measurement of the torque and then govern the engine power based on the measurement of torque and propeller rotational speed. Similarly, a second NPT/Q sensor may be coupled (e.g., mounted) to the gearbox RGB and used to measure power turbine speed and torque of the engine 100. The second NPT/Q sensor may provide independent power turbine speed and torque measurements to the protection processors 214, 224 of each channel A, B. The protection processors 214, 224 may use the power turbine speed measurement for engine power turbine overspeed protection. The protection processors 214, 224 may use the torque measurement for autofeathering. In accordance with an embodiment, the measurements of the power turbine speed and torque provided to the control processors 212, 222 are independent from the measurements of the power turbine speed and torque provided to the protection processor 214, 224. As such, if one of the NPT/Q sensors is faulty, this does not affect both control and protection processors.

In some embodiments, using the controller 200, which has the propeller and engine control and protection in a single electronic device, may allow for a reduction in the number of sensors required for control and/or protection.

In some embodiments, each dual coil sensor 502, 504 may be replaced with two separate sensors, for example, one for measuring power turbine speed and the other for measuring torque.

In some embodiments, each processor 212, 214, 222 and 224 receives independent and redundant input signals for both operation and control purposes. For example, the first control processor 212 (or the first protection processor 214) may receive at least one signal corresponding to an engine operating parameter and/or a propeller operating parameter and at least one other signal corresponding to an engine control parameter and/or a propeller control parameter. The second control processor 222 (or the second protection processor 224) may receive at least one signal corresponding to an engine operating parameter and/or a propeller operating parameter and at least one other signal corresponding to an engine control parameter and/or a propeller control parameter, where the signals received at the second control processor 222 (or the second protection processor 224) are independent from and redundant to the signals received at the first control processor 212 (or the first protection processor 214). For instance, a dual coil sensor (or two separate sensors) may be used to obtain independent and redundant measurements of a position of the pilot lever 310, which conveys an engine control parameter and/or a propeller control parameter.

Figure 5:
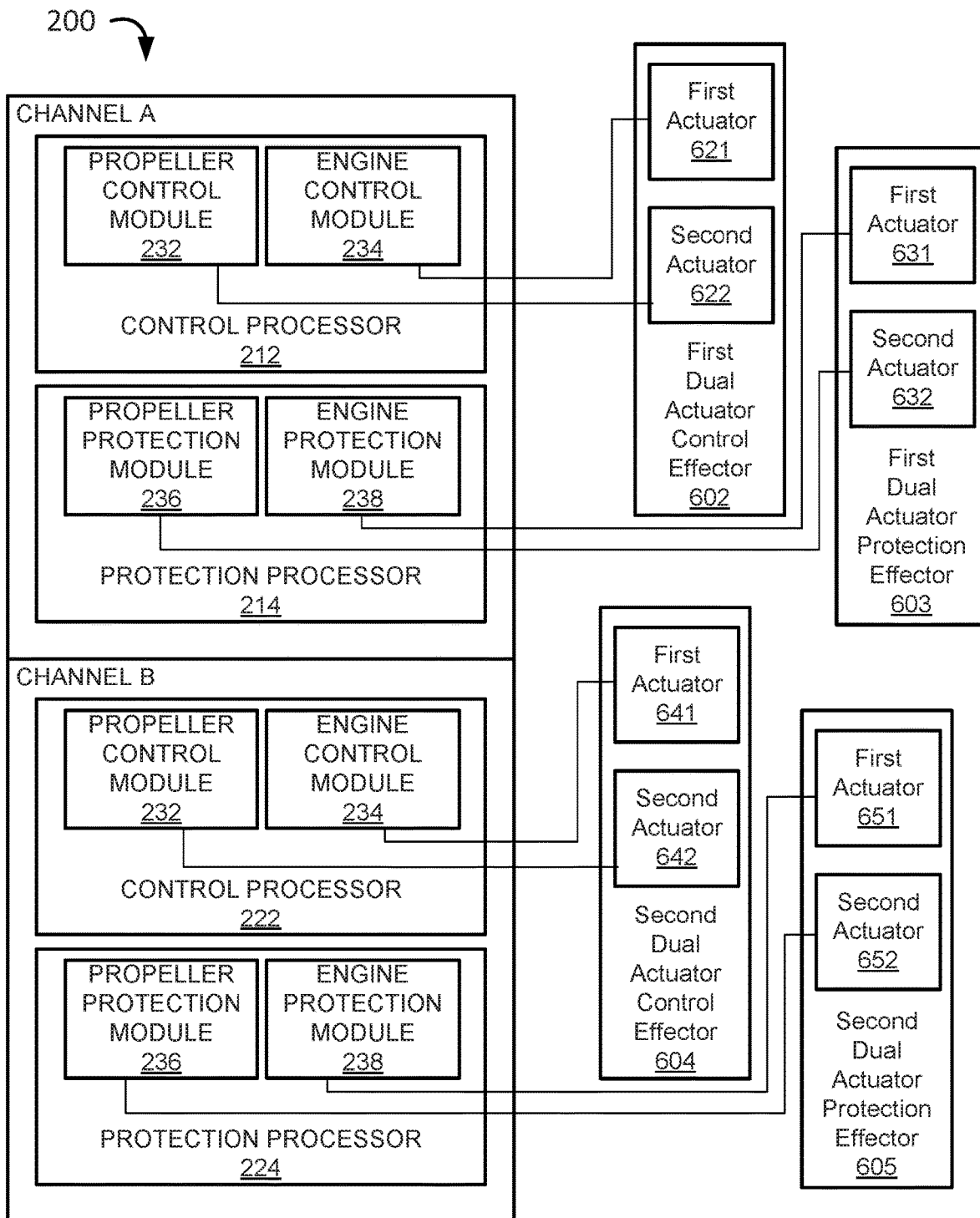
FIG. 5 is a block diagram of the controller of FIG. 3 illustrating effectors having dual actuators.

Referring to FIG. 5, the controller 200 is illustrated, where the controller 200 is communicatively coupled to a first control effector 602, a second control effector 604, a first protection effector 603 and a second protection effector 605. The control effectors 602, 604 configured to control the assembly 10 in a normal mode of operation and the protection effectors 603, 605 configured to control the assembly to prevent against a hazardous mode of operation. The controller 200 can be communicatively coupled to each of the effectors 602, 603, 604, 605 by one or more driving circuits. As used herein, the term "effector" refers to any suitable device that is used to change the operation of the engine 100 and/or the propeller 120. A given effector 602, 603, 604, 605 may comprise one or more actuators to control the operation of the engine 100 and/or the propeller 120. The terms "effector" and "actuator" may be used interchangeably. In the illustrated embodiment, the first control processor 212 is connected to the first control effectors 602, the first protection processor 214 is connected to the first protection effectors 603, the second control processor 222 is connected to the second control effectors and the second protection processor 224 is connected to the second protection effector 605. In accordance with an embodiment, each of the first control effector 602 and the second control effector 604 comprises a first actuator 621, 641 configured to control at least one physical component of the engine 100 in order to modify an operating condition of the engine 100 and a second actuator 622, 642 to control at least one physical component of the propeller 120 in order to modify an operating condition of the propeller 120. Similarly, in accordance with an embodiment, each of the first protection effector 603 and the second protection effector 605 comprises a first actuator 631, 651 configured to control at least one physical component of the engine 100 in order to modify the operating condition of the engine 100 to protect the engine 100 from hazardous conditions and a second actuator 632, 652 to control at least one physical component of the propeller 120 to modify the operating condition of the propeller 120 in order to protect the propeller 120 from hazardous conditions. The protection effectors 603, 605 when activated may be configured to override the control effectors 602, 604.

The first control processor 212 may be configured to output at least one engine control signal and/or at least one propeller control signal to the first control effector 602. The second control processor 222 may be configured to output at least one engine control signal and/or at least one propeller control signal to the second control effector 604. The first protection processor 214 may be configured to output at least one engine protection signal and/or at least one propeller protection signal to the first protection effector 603. The second protection processor 224 may be configured to output at least one engine protection signal and/or at least one propeller protection signal to the second protection effector 605.

Each processor 212, 214, 222 and 224 has at least one separate electrically independent output for outputting at least one independent signal. In some embodiments, both channels A and B are active and both are generating and outputting control and/or protection signals, thereby providing independent and redundant control and/or protection signals. Each control processor 212, 222 may generate and output one or more independent control signals for controlling a same operating condition of the engine 100 and/or a same operating condition of the propeller 120. Similarly, each protection processor 214, 224 may output one or more independent protection signals for protecting the engine 100 and/or the propeller 120. For instance, the second control processor 222 may generate control signals that are independent from and redundant to the control signals generated by the first control processor 212. Similarly, the second protection processor 224 may generate protection signals that are independent and redundant to the protection signals generated by the first protection processor 214. In some embodiments, independent and redundant input signals at the second control processor 222 (or the second protection processor 224) are used to generate control signals (or protection signals) that are independent and redundant from the control signals (or protection signals) of the first control processor 212 (or the first protection processor 214).

In some embodiments, each propeller control module 232 and each engine control module 234 outputs independent control signals. Similarly, in some embodiments, each propeller protection module 236 and each engine protection module 238 outputs independent protection signals.

In the embodiment illustrated in FIG. 5, dual actuator effectors 602, 603, 604, 605 are illustrated. Alternatively, in some embodiments, a given dual actuator effector 602, 603, 604, 605 may be replaced with two separate actuators. For example, each dual actuator effector 602, 603, 604, 605 could be replaced with a first actuator configured and connected to the controller 200 in a similar manner as the first actuator 621, 631, 641, 651 and a second actuator configured and connected to the controller 200 in a similar manner as the second actuator 622, 632, 642, 652. In some embodiments, two effectors (e.g., the control effectors 602, 604, or the protection effectors 603, 605) may be replaced with a dual channel effector, where each channel of the dual channel effector is connected to one of channels A, B of the controller 200. In other words, one of the channels of the dual channel effector may be configured and connected to the controller 200 and the other channel of the dual channel effector may be configured and connected to the controller 200. In some embodiments, both channels A, B of the controller 200 may use the same effector and thus only one control effector and one protection effector may be used. For example, both control processors 212, 222 could be connected to a common dual-channel control effector and both protection processor 214, 224 could be connected to a common dual-channel protection effector. More specifically, in some embodiments, each dual-channel effector may comprise a first and a second actuator. The control processors 212, 222 may then be connected to the first actuator and the second actuator of the dual-channel control effector and the protection processors 214, 224 may be connected to the first actuator and the second actuator of the dual-channel protection effector. In some embodiments, single actuator effectors 602, 603, 604, 605 may be used.

In some embodiments, the first actuator 621 of the first control effector 602 is configured to receive the at least one engine control signal from the first control processor 212 and the second actuator 622 of the first control effector 602 is configured to receive the at least one propeller control signal from the first control processor 212. In some embodiments, the first actuator 641 of the second control effector 604 is configured to receive the at least one engine control signal from the second control processor 222 and the second actuator 642 of the second control effector 604 is configured to receive the at least one propeller control signal from the second control processor 222. In some embodiments, the first actuator 631 of the first protection effector 603 is configured to receive the at least one engine protection signal from the first protection processor 214 and the second actuator 632 of the first protection effector 603 is configured to receive the at least one propeller protection signal from the first protection processor 214. In some embodiments, the first actuator 651 of the second protection effector 605 is configured to receive the at least one propeller protection signal from the second protection processor 224 and the second actuator 652 of the second protection effector 605 is configured to receive the at least one propeller protection signal from the second protection processor 224.

In some embodiments, the first actuator 621 of the first control effector 602 is connected to the engine control module 234 of the first control processor 212 and the second actuator 622 of the first control effector 602 is connected to the propeller control module 232 of the first control processor 212. In some embodiments, the first actuator 641 of the second control effector 604 is connected to the engine control module 234 of the second control processor 222 and the second actuator 642 of the second control effector 604 is connected to the propeller control module 232 of the second control processor 222. In some embodiments, the first actuator 631 of the first protection effector 603 is connected to the engine protection module 238 of the first protection processor 214 and the second actuator 632 of the first protection effector 603 is connected to the propeller protection module 236 of the first protection processor 214. In some embodiments, the first actuator 651 of the second protection effector 605 is connected to the engine protection module 238 of the second protection processor 224 and the second actuator 652 of the second protection effector 605 is connected to the propeller protection module 236 of the second protection processor 224. The control and protection modules 232, 234, 236, 238 can provide various control signals to the effectors 602, 603, 604, 605.

In some embodiments, the first and second control effectors 602, 604 comprise a torque motor or a stepper motor for controlling a fuel valve of the engine 100 to control the amount of fuel provided to the engine 100. In some embodiments, the first and second protection effectors comprise a fuel cut-off solenoid for stopping fuel flow to the engine 100. For example, a given control processor 212, 222 can accordingly control the fuel flow to the engine 100 and a given protection processor 214, 224 can cut-off the fuel flow to the engine 100 in the event that a commanded fuel flow from the given control processor 212, 222 is too high (e.g., above a threshold). In some embodiments, the first and second control effectors 602, 604 comprise a control valve for controlling the blade angle of the propeller 120. In some embodiments, the first and second protection effectors comprise a feather solenoid for overriding the control valve and for feathering the propeller 120. For example, a given control processor 212, 222 can accordingly control the blade angle of the propeller 120 to hold the propeller blade speed substantially constant and a given protection processor 214, 224 can feather the propeller blades in the event that the propeller blade speed is too high (e.g., above a threshold).

In some embodiments, one of the channels (e.g., channel A) is selected as being active, while the other channel remains inactive (e.g., channel B). When a channel is active, that channel is configured to generate and output control signals and, when a channel is inactive, that channel does not generate and output any control signal. If it is determined that the presently active channel or the output effector connected to the channel is faulty or inoperative, the presently active channel may be inactivated and one of the inactive channels is activated. Similarly, if, during operation, an input signal to a presently active channel is erroneous or inexistent, the presently active channel may be inactivated and one of the inactive channels is activated.

In some embodiments, the configuration of the controller 200 and/or the control system 300 allows for duplexing of the control channels, which may eliminate the requirement for a hydro-mechanical control back-up system while retaining the reliability by duplexing the electronic sensors and effectors as well as the dual process configuration for both control and protection functions.

It should be appreciated that the controller 200 may be used on a single or multi-engine aircraft.

Figure 6:
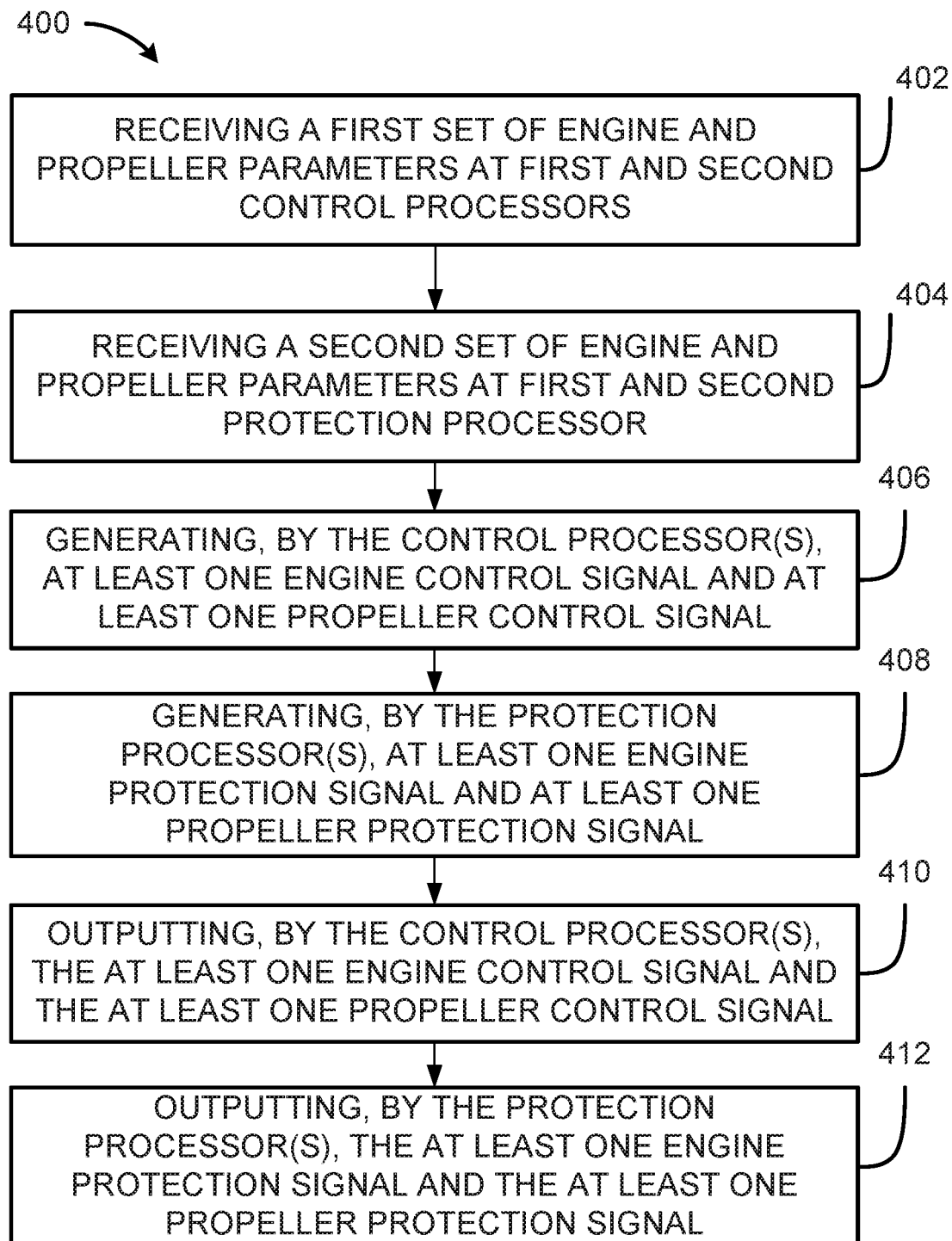
FIG. 6 is a flowchart illustrating an example method for integrated control of an engine and propeller.

With reference to FIG. 6, there is shown a flowchart illustrating an example method 400 for engine and propeller control. While the method 400 is described herein with reference to the engine 100 and the propeller 120 of FIG. 1, this is for example purposes. The method 400 may be applied to other types of engines and propellers depending on practical implementations. At step 402, a first set of engine and propeller parameters are received at a first control processor (reference 212 of FIG. 2) of a first channel (channel A in FIG. 2) and at a second control processor (reference 222 in FIG. 2) of a second channel (reference B in FIG. 2). At step 404, a second set of engine and propeller parameters are received at a first protection processor (reference 214 of FIG. 2) of the first channel A and at a second protection processor (reference 224 of FIG. 2) of the second channel B. The first set of engine and propeller parameters may be the same as or may be different from the second set of engine and propeller parameters. The first set of engine and propeller parameters received at the first control processor 212 may be independent and redundant to the first set of engine and propeller parameters received at the second control processor 222. The term "independent" in reference to engine and/or propeller parameters refers to engine and/or propeller parameters coming from different sources. The term "redundant" in reference to engine and/or propeller parameters refers to engine and/or propeller parameters that convey similar or duplicate information as other engine and/or propeller parameters. The first and second sets of engine and propeller parameters may comprise any of the parameters described herein and the receiving of the engine and propeller parameters may be as described elsewhere in this document.

At step 406, at least one of the control processors 212, 222, generates, based on the first set of engine and propeller parameters, at least one engine control signal comprising instructions for controlling an operation of the engine 100 and at least one propeller control signal comprising instructions for controlling an operation of the propeller 120. At step 408, at least one of the protection processor 214, 224, generates, based on the second set of engine and propeller parameters, at least one engine protection signal comprising instructions for protecting the engine 100 from hazardous condition(s) and at least one propeller protection signal comprising instructions for protecting the propeller 120 from hazardous condition(s). The at least one engine control signal, the at least one propeller control signal, the at least one engine protection signal and the at least one propeller protection signal may be generated as described elsewhere in this document.

At step 410, at least one of the control processor 212, 222, outputs the at least one engine control signal and the at least one propeller control signal. At step 412, at least one of the protection processor 214, 224, outputs the at least one engine protection signal and the at least one propeller protection signal. The outputting of the control and protection signals may be as described elsewhere in this document.

It should be understood that, while steps 402 and 404 are illustrated as being performed in series in FIG. 6, steps 402 and 404 may alternatively be performed in parallel. Similarly, steps 406 and 408, and steps 410 and 412 may also be performed in parallel, although illustrated in FIG. 6 as being performed in series. As such, the method 400 may comprise performing steps 402, 406, and 410 in parallel with performing steps 404, 408, and 412.

In some embodiments, one of the control processors 212, 222 is active and the other one is passive. In other words, one of the control processors 212, 222 is performing the steps of the method 400. Alternatively, in some embodiments, both of the control processors 212, 222 are active and are performing the steps of the method 400. Similarly, in some embodiments, one of the protection processors 214, 224 is active and the other one is passive such that one of the protection processors 214, 224 is performing the steps of the method 400. Alternatively, in some embodiments, both of the protection processors 214, 224 are active and are performing the steps of the method 400. In a specific and non-limiting example of implementation, one of the control processors 212, 222 is active and both of the protections processors are active 214, 224.

Figure 7:
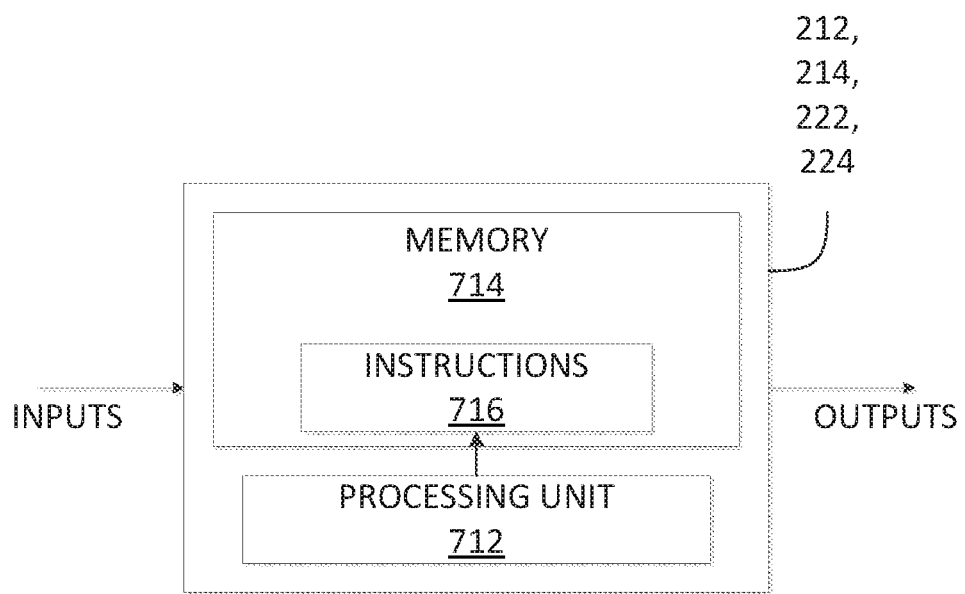
FIG. 7 is a block diagram of an example processor for implementing the controller of FIG. 2, in accordance with an embodiment.

With reference to FIG. 7, each of the processors 212, 214, 222 and 224 of the controller 200 may comprise a processing unit 712 and a memory 714 which has stored therein computer-executable instructions 716. The method 400 may be implemented by the processors 212, 214, 222 and 224. The processing unit 712 may comprise any suitable devices such that instructions 716, when executed by a processor 212, 214, 222 or 224, or other programmable apparatus, may cause the functions/acts/steps as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712.

In some embodiments, the controller 200 can be implemented as part of a full-authority digital engine controls (FADEC) or other similar device, including electronic engine control (EEC), engine control unit (ECU), and the like.

The method 400 and the functionality of the controller 200 and the processors 212, 214, 222 and 224 described herein may be implemented in a high level procedural or object oriented programming or scripting language, or a combination thereof, to communicate with or assist in the operation of a control system, for example the control system 300. Alternatively, the method 400 and the functionality of the controller 200 and the processors 212, 214, 222 and 224 may be implemented in assembly or machine language. The language may be a compiled or interpreted language. Program code for implementing the method 400 and the functionality of the controller 200 and the processors 212, 214, 222 and 224 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the method 400, the controller 200, control system 300 and/or processors 212, 214, 222 and 224 may also be considered to be implemented by way of a non-transitory computer-readable storage medium having a computer program stored thereon. The computer program may comprise computer-readable instructions which cause a computer, or in some embodiments the processing unit 712, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the method, the controller and/or the control system may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. An electronic controller for an engine and a propeller coupled to the engine, the controller comprising:
   a first communication channel and a second communication channel independent from and redundant to the first communication channel, each communication channel having a control processor and a protection processor communicating thereover, the control processor controlling the engine and the propeller in a normal mode of operation thereof and the protection processor controlling the engine and the propeller to prevent against a hazardous mode of operation thereof, the control processor configured to receive a first set of engine and propeller parameters and to output, based on the first set of engine and propeller parameters, at least one engine control command and at least one propeller control command, the at least one engine control command comprising instructions for controlling the engine in the normal mode of operation and the at least one propeller control command comprising instructions for controlling the propeller in the normal mode of operation, and
   the protection processor configured to receive a second set of engine and propeller parameters and to output, based on the second set of engine and propeller parameters, at least one engine protection command and at least one propeller protection command, the at least one engine protection command comprising instructions overriding the at least one engine control command to prevent hazardous operation of the engine and the at least one propeller protection command comprising instructions overriding the at least one propeller control command to prevent hazardous operation of the propeller.

2. The electronic controller of claim 1, wherein the control processor comprises an engine control module configured for generating the at least one engine control command based on at least one engine parameter of the first set of engine and propeller parameters, and a propeller control module configured for generating the at least one propeller control command based on at least one propeller parameter of the first set of engine and propeller parameters.

3. The electronic controller of claim 2, wherein the engine control module is configured to generate the at least one engine control command comprising instructions for one or more of: governing a rotational speed of the engine, governing an output power of the engine, limiting a torque of the engine, and limiting a rotational speed of the engine.

4. The electronic controller of claim 2, wherein the propeller control module is configured to generate the at least one propeller control command comprising instructions for one or more of: governing a beta angle of the propeller and governing a rotational speed of the propeller.

5. The electronic controller of claim 2, wherein the protection processor comprises an engine protection module configured for generating the at least one engine protection command based on at least one engine parameter of the second set of engine and propeller parameters, and a propeller protection module configured for generating the at least one propeller protection command based on at least one propeller parameter of the second set of engine and propeller parameters.

6. The electronic controller of claim 5, wherein the engine protection module is configured to generate the at least one engine protection command comprising instructions for one or more of: protecting the engine from overspeed and protecting the engine from uncontrolled high thrust.

7. The electronic controller of claim 5, wherein the propeller protection module is configured to generate the at least one propeller protection command comprising instructions for one or more of: protecting the propeller from overspeed, feathering the propeller when an output power of the engine is not contributing to thrust, and protecting the propeller from minimum flight beta.

8. The electronic controller of claim 1, wherein the first set of engine and propeller parameters and the second set of engine and propeller parameters are the same.

9. The electronic controller of claim 1, wherein the second set of engine and propeller parameters receivable by the control processor of the second communication channel are independent to and redundant from the first set of engine and propeller parameters receivable by the control processor of the first communication channel.

10. The electronic controller of claim 9, wherein the second set of engine and propeller parameters receivable by the protection processor of the second communication channel are independent to and redundant from the second set of engine and propeller parameters receivable by the protection processor of the first communication channel.

11. A method for controlling an engine and a propeller coupled to the engine, the method comprising:
receiving a first set of engine and propeller parameters at a first control processor provided in a first communication channel and at a second control processor provided in a second communication channel independent from and redundant to the first communication channel;
receiving a second set of engine and propeller parameters at a first protection processor provided in the first communication channel and at a second protection processor provided in the second communication channel;
generating, by at least one of the first control processor and the second control processor and based on the first engine and propeller parameters, at least one engine control command and at least one propeller control command, the at least one engine control command comprising instructions for controlling the engine in the normal mode of operation and the at least one propeller control command comprising instructions for controlling the propeller in the normal mode of operation;
generating, by at least one of the first protection processor and the second protection processor and based on the second engine and propeller parameters, at least one engine protection command and at least one propeller protection command, the at least one engine protection command comprising instructions for overriding the at least one engine control command to prevent hazardous operation of the engine and the at least one propeller protection command comprising instructions for overriding the at least one propeller control command to prevent hazardous operation of the propeller;
outputting, by at least one of the first control processor and the second control processor, the at least one engine control command and the at least one propeller control command; and
outputting, by at least one of the first protection processor and the second protection processor, the at least one engine protection command and the at least one propeller protection command.

12. The method of claim 11, wherein generating the at least one engine control command comprises generating the at least one engine control command based on at least one engine parameter of the first set of engine and propeller parameters; and wherein generating the at least one propeller control command comprises generating the at least one propeller control command based on at least one propeller parameter of the first set of engine and propeller parameters.

13. The method of claim 12, wherein generating the at least one engine control command comprises generating instructions for one or more of governing a rotational speed of the engine, governing an output power of the engine, limiting a torque of the engine and limiting a rotational speed of the engine.

14. The method of claim 12, wherein generating the at least one propeller control signal comprises generating instructions for one or more of: governing a beta angle of the propeller and governing a rotational speed of the propeller.

15. The method of claim 12, wherein generating the at least one engine protection command comprises generating the at least one engine protection command based on at least one engine parameter of the second set of engine and propeller parameters; and wherein generating the at least one propeller protection command comprises generating the at least one propeller control command based on at least one propeller parameter of the second set of engine and propeller parameters.

16. The method of claim 15, wherein generating the at least one engine protection command comprises generating instructions for protecting the engine from overspeed.

17. The method of claim 15, wherein generating the at least one propeller protection command comprises generating instructions for one or more of: protecting the propeller from overspeed and feathering the propeller when an output power of the engine is not contributing to thrust.

18. The method of claim 11, wherein the first set of engine and propeller parameters and the second set of engine and propeller parameters are the same.

19. The method of claim 11, wherein the second set of engine and propeller parameters received by the second control processor are independent to and redundant from the first set of engine and propeller parameters received by the first control processor.

20. The method of claim 11, wherein the second set of engine and propeller parameters received by the second protection processor are independent to and redundant from the second set of engine and propeller parameters received by the first protection processor.

* * * * *